United States Patent [19]

Grishin

[11] 4,119,476
[45] Oct. 10, 1978

[54] METHOD OF PRODUCING GAS DEVELOPING AGENT FOR CELLULAR CONCRETES

[76] Inventor: Boris Vasilievich Grishin, ulitsa Sevastopolskaya, II, kv. 51, Kuibyshev, U.S.S.R.

[21] Appl. No.: 749,443

[22] Filed: Dec. 10, 1976

Related U.S. Application Data

[60] Continuation of Ser. No. 474,143, May 28, 1974, abandoned, which is a division of Ser. No. 228,735, Feb. 23, 1972, abandoned.

[51] Int. Cl.$^2$ ............................................. C04B 21/02
[52] U.S. Cl. .................................................... 106/87
[58] Field of Search .................... 106/86, 87, 290, 314

[56] References Cited

U.S. PATENT DOCUMENTS

| | | | |
|---|---|---|---|
| 2,378,432 | 6/1945 | Rethwisch et al. | 106/290 |
| 3,147,177 | 9/1964 | Owens et al. | 106/87 |
| 3,442,672 | 5/1969 | Kampf | 106/87 |

*Primary Examiner*—J. Poer
*Attorney, Agent, or Firm*—Holman & Stern

[57] ABSTRACT

The method comprises the use of aluminium production wastes in the form of slags obtained from the melting of aluminium alloys and the separation of a fraction of particles of from 0.3 to 1.2 mm in size from the slags as a gas developing agent for cellular concretes.

6 Claims, No Drawings

METHOD OF PRODUCING GAS DEVELOPING AGENT FOR CELLULAR CONCRETES

CROSS-REFERENCE TO RELATED APPLICATIONS

This is a continuation of application Ser. No. 474,143 filed May 28, 1974 which in turn was a division of application Ser. No. 228,735 filed Feb. 23, 1972, both now abandoned.

BACKGROUND OF THE INVENTION

The present invention relates to methods of producing a gas developing agent for cellular concretes.

In the present state of the art a gas developing agent commonly used in the manufacture of cellular concretes is made of aluminium powder prepared by the fine particulation of pure metallic aluminium.

Such a gas developing agent, however, is an expensive and critical material, and its production is labor-consuming since aluminium granules are difficult to grind.

An attempt has been made to produce a gas developing agent from the wastes of aluminium manufacturing processes, particularly from filter cakes resulting from the production of aluminium and aluminium alloys by a thermal process.

This process consists of subjecting an aluminium-containing alloy to vacuum filtration in an ore heat-treating furnace and then reducing the aluminium. The filter cakes which are wastes from the reduction of aluminium contain from 50 to 60 percent of Al, from 4 to 5 percent of Fe, from 8 to 10 percent of Mn and other admixtures.

For producing a gas developing agent, the filter cakes are ground together with dried quartz sand to a specific particle surface size of from 5,000 to 6,000 cm$^2$/g (See, e.g., Inventor's Certificate of the USSR No. 149,342.

The filter cakes resulting from the vacuum filtration of aluminium and its alloys are lumps of an aluminium alloy that are difficult to grind and have a small percentage of pure aluminium.

For this reason the process of producing a gas developing agent from such material is inefficient with the resulting gas developing agent having a low activity.

In view of the fact that the quantity of filter cakes available in the above-mentioned process of vacuum filtration of aluminium is small, the process of producing a gas developing agent therefrom has found no industrial application.

SUMMARY OF THE INVENTION

It is an object of the present invention to eliminate the above disadvantages.

It is a specific object of the invention to provide a method of producing a gas developing agent for cellular concretes which is based on the utilization of wastes from aluminium production processes, making possible the production of a gas developing agent featuring a high activity, a high degree of dispersity and especially a low cost.

The above object has been accomplished by grinding wastes from aluminium manufacturing processes, such as slags resulting from the melting of aluminium alloys.

The particles separated from the slags for use in the grinding process have a particle size of from 0.3 to 1.2 mm and contain up to 70 percent metallic particles.

In this way use can be made of waste slags resulting from the melting of secondary aluminium alloys. In this case the separated fraction should be advantageously washed with water in order to remove chlorides, the water being taken in such an amount as to maintain a neutral or an almost neutral medium, the washed fraction being then dried before the grinding thereof.

In some cases it is expedient that the separated slag fraction be mixed with a loose abrasive material before grinding.

The use of wastes from aluminium manufacturing processes provides for an inexpensive and a highly dispersible gas developing agent for use in cellular concretes, since these slags are a waste product having a particle size less than 1.2 mm which feature a lower viscosity and plasticity than pure aluminium.

This can be explained by the fact that these slags contain metallic particles with up to 35 percent of an aluminium-based alloy, up to 35 percent of $Al_2O_3$, up to 20 percent of NaCl and KCl and insignificant amounts of Mg, Mn, Zn, Cu, MgO, $SiO_2$, etc.

The slag fractions with particle sizes less than 1.2 mm are produced by crushing and classifying the slag. The fraction with particles larger than 1.2 mm, which contain up to 90 percent of an aluminium-based alloy is recovered for remelting; and the fraction with particles less than 1.2 mm in size is usually disposed of as waste.

Obtaining a 0.3 to 1.2 mm fraction from slags, which contains up to 70 percent of metallic particles, finds utility in the production of a high-activity gas developing agent.

The chemical composition of slags has been found to differ with their granulometric composition. The highest metallic compound in slag (up to 65 to 75 percent) is found in the 0.3 to 1.2 mm fraction.

In finer slag fractions the content of metallic particles of an aluminium based alloy sharply decreases.

The 0.3 to 1.2 mm fraction is then ground to obtain particles for the gas developing agent which are from 2 to 5 microns in size. The slags contain alumina which is an abrasive material, whose particles are more brittle than those of pure aluminium. The grinding of the slags, therefore, proceeds 1.1 to 1.2 times faster than the grinding of granules of pure aluminium of the same size.

It is possible to use the waste slags resulting from the melting of secondary aluminium alloys which contain up to 10-20 percent of metallic particles of an aluminium-based alloy, up to 20 percent of $Al_2O_3$, up to 65 – 70 percent of NaCl, KCl, $CaCl_2$ and insignificant amounts of Mg, Mn, Zn, Cu, MgO and $SiO_2$ as the raw materials for the gas developing agent. The salts contained in large amounts in this variety of slags are admixtures which diminish the activity of the gas developing agent, and therefore they can, for example, be removed from the slags by washing with water. To preclude oxidation of the aluminium, the medium should be maintained either neutral or almost neutral.

In the course of washing the slags with water the soluble salts (NaCl, KCl, $MgCl_2$ and $CaCl_2$) are removed and after drying the thus washed slags the percentage of metallic particles of the aluminium-based alloy becomes higher.

Thus, by preliminary screening the fraction finer than 0.3 mm, or by preliminary screening and washing the water-soluble salts with water, the slags of both varieties (the 0.3 to 1.2 mm fraction) containing up to 70 percent of metallic particles of aluminium-based alloys are obtained.

However, the grinding of slags obtained from melting standard aluminium alloys, as well as slags washed from salts, obtained from melting secondary aluminium alloys, for producing a gas developing agent with grains from 2 to 5 microns in size, is the result of a labor-consuming process. Moreover, the grains of the resulting gas developing agent are similar to the grains of aluminium powder which have a lamellar texture. This feature hampers the process of formation of spherical pores in cellular concrete during the course of chemical interaction between the grains of the gas developing agent and the alkaline medium of the mortar.

In order to reduce the time required for grinding to obtain the advantageous spherical grains of the gas developing agent, the separated slag fraction, prior to grinding, is mixed with a loose abrasive material, such as quartz sand, in varying weight ratios (slag-to-sand ratio of from 1:1 to 1:20, preferably, from 1:1 to 1:2). The mixture is then ground until spherical particles are obtained having a diameter of from 2 to 5 microns.

Sand features good abrasive properties, which contributes to the maximum rapid grinding of the mixture to the required degree of dispersity, and its presence in air together with the aluminium dust ensures the formation of an explosionproof mixture. Microscopic investigations of the structure of different slag-and-sand mixtures ground to the grain size of from 2 to 5 microns have shown the aluminium particles in gas developing agents to be spherical, in contradistinction to the lamellar structure of the aluminium powder. Moreover, the aluminium particles, during comminution, envelop alumina particles with a thin film. This film holds strongly on to the surface of the sand, which ensures a uniform distribution of the gas developing agent within the mortar upon the introduction of the agent thereinto and, as a consequence, a more uniform structure of cellular concrete.

For the best possible protection of aluminium alloy particles against oxidation, the process of grinding the 0.3 to 1.2 mm slag fraction with or without the abrasive material must be carried out in a neutral medium, for example in a nitrogen atmosphere with the content of oxygen not higher than 8 percent. Moreover, for intensifying the grinding process and for preventing agglomeration of the finely ground particles, it is possible to introduce small amounts of fats such as technical stearine or paraffin, into the material being ground. It is most rational to add fats in an amount sufficient for the formation of a 3 to 4-molecular layer on the particle surface. However, the gas developing agent produced with the introduction of fats into the mixture must be subsequently subjected to an additional treatment before being used, so as to remove the fat film from the particles of the gas developing agent.

It should be pointed out that up until now slags of a fraction finer than 1.2 mm, which form during the production of aluminium alloys were regarded as irreparable losses and disposed of as wastes. The utilization of these slags proposed by me for producing a gas developing agent instead of aluminium powder when manufacturing cellular concretes allows for a considerable economic advantage.

DETAILED DESCRIPTION OF THE PREFERRED EMBODIMENT

The herein-proposed method of producing a gas developing agent is described in greater detail in the Examples which follow.

EXAMPLE 1

Waste slags resulting from making aluminium alloys, which contain up to 35 percent of metallic aluminium, were obtained by sieving on a vibrating screen or by an electronic separation method. A fraction of a class of particles of from 0.3 to 1.2 mm was obtained, containing 70 percent of metallic particles of an aluminium-based alloy, 25 percent of $Al_2O_3$, 5 percent of admixtures of Mg, Mn, Zn, Cu, MgO and $SiO_2$ and 2 percent of NaCl and KCl salts.

The presence of small amounts of the soluble salts in the porous concrete mixture has a modifying effect, i.e., increasing the content of $(OH)^-$ ions, activating the binding properties of the mixture, so that there is no need in washing these salts out of this variety of slags.

The slag fraction was ground in a ball mill to a particle size of from 2 to 5 microns which was transferred to cyclones, where the product of the grinding process settled and was then delivered to appropriate containers.

The product of the grinding was a gas developing agent with lamellar grains similar in shape to those of aluminium powder.

EXAMPLE 2

A gas developing agent was produced by following the procedure described in Example 1.

To intensify the grinding process, the slag fraction was mixed before grinding with a loose abrasive material such as quartz sand in a slag-to-sand ratio of 1:2 (by weight), and the resulting mixture was ground until a particle size of from 2 to 5 microns was obtained for the gas developing agent.

Use can also be made of alumina, carborundum powder, and the like as the abrasive material.

The grinding of the slag with the abrasive material resulted in a reduction in the grinding time of from 1.3 to 2.0 times, with the grains of the gas developing agent being spherical in shape and from 2 to 5 microns in diameter.

EXAMPLE 3

For producing a gas developing agent waste slags resulting from the melting of secondary aluminium alloys were used, with the slags containing up to 20 percent of metallic aluminium and 70 percent of NaCl and KCl salts.

The salts were removed from the slags by washing with water in a power-driven agitator. Water was taken in such an amount as to keep the medium neutral or close to neutral. After washing the slags, they were drained and the solid residue was dried at a temperature of from 100°–110° C, whereupon a 0.3 to 1.2 mm size fraction was separated therefrom for grinding.

The fraction was then ground until a gas developing agent was obtained, by following the procedure described in Example 1.

EXAMPLE 4

A gas developing agent was prepared as described in Example 3.

To intensify the grinding process, the separated slag fraction, before the grinding thereof, was admixed with dried quartz sand in a slag-to-sand weight ratio of 1.2, the grinding continued until particles of the gas developing agent were from 2 to 5 microns in size.

The resulting particles of the gas developing agent were spherical in shape.

The activity of the gas developing agent was determined by the gas-volumetric method, that is, by the amount of gas evolved when the gas developing agent was mixed with NaOH as compared with the volume of the gas evolved from 1 g of degreased aluminium powder. The volume of the gas evolving from a 1 g batch of aluminium powder is calculated from the equation $$2Al + 3Ca(OH)_2 = 3(CaO).Al_2O_3 + 3H_2.$$

54 g of aluminium give $3 \times 22.4 = 67.2$ l of hydrogen, i.e., 1 g of aluminium powder under normal conditions gives $$67.2:54 = 1245 \text{ cu.cm of gas.}$$

A flask with alkali and aluminium powder (the gas developing agent) was heated to a temperature of 40° C (an approximate temperature of the cellular mixture before the heat treatment thereof). At this temperature the volume of the gas evolved from 1 g of the aluminium powder was 1470 cu.cm.

The volume of gas evolved from 1 g of the gas developing agents prepared as described in Examples 1 and 3 was 930 and 940 cu.cm respectively, hence the activity of the gas developing agents was $$(930 \cdot 100/1470) = 63\%$$

as compared with pure aluminium powder.

consequently, to obtain an equal effect on a cement or a lime-cement mortar (depending on the content of active aluminium), the consumption of the gas developing agent per 1 cu.m (of gas silicate) should be $100/63 = 1.6$ times that of degreased aluminium powder, that is, approximately $$500 \times 1.6 = 800 \text{ g}$$

However, the particles of the gas developing agent produced, similar to aluminium powder particles, were lamellar in shape.

The gas developing agents prepared as described in Examples 2 and 4 had a 20 percent activity (as determined by the above-described gas-volumetric method) in comparison to the activity of the degreased aluminium powder.

Consequently, to obtain an equal effect on a gas concrete mixture (depending on the content of active aluminium), the consumption of the gas developing agent per 1 cu.m of gas concrete should be five times that of aluminium powder, that is, $500 \times 5 = 2500$ g.

The particles of tha gas developing agents produced were from 2 to 5 microns in size and spherical in shape.

Industrial tests of the gas developing agent were carried out with a mixture comprising the following components: sand ground to a specific surface of 3000 sq.cm/g, Portland cement with an ultimate strength of 400 kg/sq.cm and lime with a 45 percent activity.

Tests of gas concrete were carried out with mixtures of the following 2 compositions.

(1) For producing 1 cu.m of structural heat-insulation gas concrete:
cement . . . 257 kg
sand . . . 460 kg
lime . . . 22 kg (2) For producing 1 cu.m of heat-insulation gas concrete:
cement . . . 140 kg
sand . . . 294 kg
lime . . . 12 kg The W/C ratio was adopted to be from 0.55 to 0.58.

For the creation of the cellular structure, the gas developing agents were introduced into the concrete mixture, which were prepared as described in Examples 1 to 4; for comparison parallel tests were run using aluminium powder from whose particles the fat film had been removed. For producing 1 cu.m of structural heat-insulation concrete, 800 g of the gas developing agent were introduced, that is, 1.6 times more than for the aluminium powder (for the gas developing agent prepared as set forth in Examples 1 and 3), and 2500 g of the gas developing agent, that is, 5 times more than for the aluminium powder (for the gas developing agent prepared as set forth in Examples 2 and 4). Also, for the sake of comparison, a batch of structural heat-insulation gas concrete was prepared from the mixture of the same composition on the basis of aluminium powder taken in an amount of 500 g per cu.m of the gas concrete.

For producing 1 cu.m of heat-insulation gas concrete, 1080 g of the gas developing agent were introduced (i.e., 1.6 times more than for the aluminium powder) which was prepared as described in Examples 1 and 3, and 3375 g of the gas developing agent (i.e., 5 times more than for the aluminium powder) which was prepared as described in Examples 2 and 4. Also, for the sake of comparison, a batch of heat-insulation gas concrete was prepared from the mixture of the same composition on the basis of aluminium powder taken in an amount of 675 g.

After the expansion of the mass and further heat treatment of the specimens, the latter were subjected to tests. The main physico-mechanical properties of the produced structural heat-insulation concretes are given in Table 1, and those of the heat-insulation concrete, in Table 2.

Table 1

| Nos. | Name of material | Bulk mass, kg/cu.m | Porosity, % | Compression strength, kg/sq.cm | Tensile strength, kg/sq.cm | Humidity, % |
|---|---|---|---|---|---|---|
| | Gas concrete based on gas developing agents as prepared in Examples: | | | | | |
| 1. | Example 1 | 700 | 51.9 | 58.0 | 7.0 | 14.8 |
| 2. | Example 2 | 700 | 51.0 | 57.0 | 7.1 | 14.5 |
| 3. | Example 3 | 700 | 53.9 | 59.5 | 7.8 | 13.6 |
| 4. | Example 4 | 700 | 52.6 | 60.0 | 7.2 | 14.0 |
| 5. | Gas concrete based on aluminium powder | 700 | 51.0 | 57.5 | 6.5 | 16.0 |

Table 2

| Nos. | Name of material | Bulk mass, kg/cu.m | Porosity, % | Compression strength, kg/sq.cm | Tensile strength, kg/sq.cm | Humidity, % |
|---|---|---|---|---|---|---|
| | Gas concrete based on gas developing agents as prepared in Examples: | | | | | |
| 1. | Example 1 | 400 | 65 | 13.0 | 2.85 | 21.8 |
| 2. | Example 2 | 400 | 68 | 13.9 | 2.9 | 22.9 |
| 3. | Example 3 | 400 | 65.4 | 13.1 | 2.9 | 21.9 |
| 4. | Example 4 | 400 | 69.0 | 13.8 | 2.85 | 22.1 |
| 5. | Gas concrete based an aluminium powder | 400 | 64 | 12.9 | 2.8 | 22 |

The study of the macrostructure of gas concretes produced on the basis of the aluminium powder and on the basis of the gas developing agents has revealed that the distribution of the pores in the gas concretes based upon the gas developing agents are more uniform than in those based upon the aluminium powder.

This effect is attained due to the fact that the gas developing agents produced by the method proposed herein was introduced in a considerably greater amount per cu.m of the gas concrete than in case of the aluminium powder, this being conducive to a more uniform distribution thereof in the concrete mixture.

The pores in the gas concretes with the gas developing agents were spherical in shape, their number per unit area was greater than in the case of gas concretes based upon the aluminium powder, and the size of the pores is 1.25 to 1.5 times smaller.

This can be explained by the fact that the gas developing agents based on slags have a higher degree of dispersity than the aluminium powder.

As can be seen from the above Tables, a more perfect structure for the gas concretes based upon the gas developing agents ensures higher physico-mechanical and thermophysical properties for the concretes.

The scope of the present invention is in no way limited to the Examples given hereinabove. In each particular case the amount of the gas developing agent required per cu.cm of the cellular concrete must be equal, with respect to the quantity of free aluminium, to the amount of the aluminium powder to be used per cu.m of the concrete, this amount being adopted as a standard for each particular composition of the mixture from which cellular concretes are to be manufactured. For determining the equivalent, the activity of the gas developing agent and aluminium powder should be determined by the gas-volumetric method at a temperature corresponding to that of the cellular mixture within the period of expansion thereof.

The above description shows that the gas developing agents produced by the herein-proposed method for use in the manufacture of cellular concretes feature high activity and a high degree of dispersity. This permits the manufacture of gas concretes based upon the gas developing agents to have a more perfect structure and higher physico-mechanical and thermophysical properties than gas concretes manufactured with the use of aluminium powder. The replacement of the critical and expensive aluminium powder by the gas developing agents produced by the method of the present invention results in a considerable economic saving.

What is claimed is:

1. A method of forming a gas concrete comprising the steps of: separating a fraction having a particle size of from 0.3 to 1.2 mm from aluminium production wastes in the form of slag obtained in making standard aluminium alloys, the fraction containing up to 70% of metallic particles of an aluminium-based alloy; grinding the separated fraction in a neutral atmosphere until a ground fraction having a particle size of from 2 to 5 microns is obtained; and mixing the ground separated fraction with a gas concrete mixture.

2. The method as claimed in claim 1 further comprising, in the case where slags obtained in making secondary aluminium alloys are employed, the steps of, prior to grinding the separated fraction: washing the separated fraction with water to remove chlorides; and drying the washed separated fraction.

3. The method as claimed in claim 1, further comprising the step of, prior to grinding the separated fraction, mixing a loose abrasive material with the separated fraction in a slag-to-abrasive material ratio of from 1:1 to 1:20 by weight.

4. The method as claimed in claim 3 wherein the abrasive material is quartz sand and the slag-to-abrasive material ratio is from 1:1 to 1:2 by weight.

5. The method as claimed in claim 2, further comprising the step of, prior to grinding the separated fraction, mixing a loose abrasive material with the separated fraction in a slag-to-abrasive material ratio of from 1:1 to 1:20 by weight.

6. The method as claimed in claim 5 wherein the abrasive material is quartz sand and the slag-to-abrasive material ratio is from 1:1 to 1:2 by weight.

* * * * *